United States Patent
Sinha et al.

(10) Patent No.: US 12,242,898 B2
(45) Date of Patent: Mar. 4, 2025

(54) SYSTEMS, METHODS AND COMPUTER PROGRAM PRODUCTS FOR JOB MANAGEMENT

(71) Applicant: Spillbox Inc., San Jose, CA (US)

(72) Inventors: Alok Kumar Sinha, San Jose, CA (US); Rajeev Prasad, San Jose, CA (US)

(73) Assignee: Spillbox Inc., San Jose, CA (US)

( * ) Notice: Subject to any disclaimer, the term of this patent is extended or adjusted under 35 U.S.C. 154(b) by 350 days.

(21) Appl. No.: 18/075,744

(22) Filed: Dec. 6, 2022

(65) Prior Publication Data

US 2023/0176923 A1 Jun. 8, 2023

Related U.S. Application Data

(60) Provisional application No. 63/286,217, filed on Dec. 6, 2021.

(51) Int. Cl.
*G06F 9/50* (2006.01)
*G06F 9/48* (2006.01)

(52) U.S. Cl.
CPC .......... *G06F 9/5072* (2013.01); *G06F 9/4806* (2013.01); *G06F 9/5005* (2013.01); *G06F 9/5027* (2013.01)

(58) Field of Classification Search
CPC .... G06F 9/4806; G06F 9/5072; G06F 9/5055; G06F 9/5027
See application file for complete search history.

(56) References Cited

U.S. PATENT DOCUMENTS

| | | | |
|---|---|---|---|
| 11,853,807 B1 * | 12/2023 | Coult | G06F 9/5077 |
| 2017/0357531 A1 * | 12/2017 | Zhang | G06F 9/5027 |
| 2020/0272511 A1 * | 8/2020 | Gauthier | G06F 9/5038 |
| 2020/0379813 A1 * | 12/2020 | Casotto | G06F 9/5072 |

* cited by examiner

*Primary Examiner* — Clayton R Williams
(74) *Attorney, Agent, or Firm* — Schroeder Law PC

(57) ABSTRACT

The invention provides methods, systems and computer program products for job management and for allocating resources for cloud based or remote device based job processing. The invention provides a scalable architecture for job management and for allocating resources for cloud based or remote device based job processing comprising a job manager machine, having a resource pool of secondary job manager machines assigned thereto. The job manager machine has a resource pool of computing machines assigned thereto—comprising at least a gateway machine and a non-gateway machine. Received jobs or computing tasks are selectively transmitted to one of the gateway machine and the non-gateway machine. Each of the gateway machine and the non-gateway machine are configured to respond differently to forwarded job or computing task.

13 Claims, 9 Drawing Sheets

SYSTEMS, METHODS AND COMPUTER PROGRAM PRODUCTS FOR JOB MANAGEMENT

FIELD OF THE INVENTION

The present invention relates to the domain of cloud based or remote device based computing, and more particularly to methods, systems and computer program products for job management and for allocating resources for cloud based or remote device based job processing.

BACKGROUND OF THE INVENTION

For the purpose of the present invention, the terms "computing resource", "machine", "computing machine", "computing device", and/or "data processing device" may be used interchangeably, and shall be understood as referring to a processor based computing device.

Cloud based or network based data centers for providing on-demand computing infrastructure has become widespread. Client application software that were previously executed only on computing devices within the premises of an entity or organization ("On-premise device(s)"), is now capable of being executed on remote servers or remote computing devices located at a remote facility outside the client premises (for example, within a server farm or cloud)—i.e. within a remote computing environment.

When providing on-demand computing within a cloud based or network based remote environment, operations or jobs performed within the remote environment require computing resources (e.g., machines, computing devices, processing cores, memory etc.). The remote computing environment typically implements the allocation of computing resources to pending jobs through a job manager (i.e. a computing device configured to implement functionality of a job manager). A job manager comprises a server or processor implemented entity that is granted access to a resource pool comprising a set of machines, for execution of jobs forwarded to the remote environment for execution. The job manager is configured to queue the received jobs, and distribute each received job (or individual computing tasks associated with a received job) to one or more machines within the resource pool, for execution.

The output from the executed job/computing task(s) is passed back to the job manager by the machine that has been assigned the responsibility for execution of that job/computing task. The job manager transmits the output back to the client device from which a request for remote environment based execution of the job was received. In summary, a job manager is tasked with the responsibility of one or more of (i) receiving jobs for execution within a remote environment, (ii) controlling a set of machines that comprise a resource pool associated with the job manager, (iii) queuing the received jobs for execution by the resource pool, (iv) assigning or distributing queued jobs (or computing tasks associated with such jobs) among the set of machines within the resource pool, and (v) routing the output from completed jobs back to a computing device from which a request for performing the corresponding completed job has been received, or to a target computing device selected as the intended recipient for output of a completed job.

FIG. 1 illustrates a conventional remote computing environment 100 wherein jobs for execution within the remote computing environment are transmitted to the remote computing environment from job execution requesting device(s) 102 via a network 104. The jobs are received at a job manager 106—which has access to and implements performance of received jobs through a job manager resource pool 108. The job manager resource pool 108 comprises a plurality of computing machines for executing received jobs or individual tasks within received jobs—i.e. machine 1 (1082), machine 2 (1084), upto machine n (1086). The job manager 106 may comprise a computing machine that is configured to (i) queue the received jobs, (ii) distribute each received job (or tasks corresponding to the received job(s)) to one or more machines 1082 to 1086 within the job manager resource pool 108 for execution, and (iii) route the output from one or more completed jobs (or computing tasks) back to the job execution requesting device(s) 102.

Execution of jobs in a remote environment via a conventional job manager has been found to suffer from multiple drawbacks. First, as a result of finite processing capacity of the job manager, the job manager itself becomes a bottleneck to execution of jobs. Additionally, job managers and the corresponding resource pool of computing machines assigned to each job manager have a finite capacity to handle computing loads—which is typically calculated based on a mean load or average load that the job manager and its resource pool is anticipated to receive. However, when peak loads exceed the capacity that the job manager is configured to handle, this leads to unacceptable latency and waiting times, and in extreme cases can result in a denial of service. c, There is accordingly a need for a readily scalable system that enables execution of jobs within a remote environment while eliminating the bottlenecks associated with job managers of the type illustrated in FIG. 1. There is also a need to enable job managers to handle peak loads that exceed the computing loads that the job manager has been configured to handle, in a manner that eliminates or reduces processing overheads and latency.

SUMMARY

The invention relates to the domain of cloud based or remote device based computing, and more particularly to methods, systems and computer program products for job management and for allocating resources for cloud based or remote device based job processing.

The invention provides a method for implementing job execution within a network based remote computing environment. The method comprises (i) receiving at a first job manager machine, a first job execution request transmitted by a job execution requesting device, wherein the received job execution request has been transmitted to the first job manager machine for execution within a remote computing environment, and identifies a job for execution within a remote computing environment, (ii) selecting from among a first set of computing machines assigned to the first job manager machine, a first target computing machine, (iii) transmitting to the selected first target computing machine, a first data message comprising data that has been received within the first job execution request, (iv) receiving from the first target computing machine, output data comprising an execution output of one or more computing tasks associated with the identified job, and (v) transmitting the received output data to the job execution requesting device—wherein (vi) the selected first target computing device is one of a first non-gateway machine and a first gateway machine, (vii) the first non-gateway machine is a processor implementing computing machine configured to respond to receiving the first data message from the first job manager machine by (a) generating the output data by executing the one or more computing tasks associated with the identified job, and (b) transmitting the output data to the first job manager machine, and (viii) the first gateway machine is a processor implementing computing machine configured to respond to receiving the first data message from the first job manager machine by (c) transmitting a second job execution request to a second job manager machine that is different from the first job manager machine, wherein the second job execution request includes data identifying the identified job, (d) receiving from the second job manager machine, output data comprising an execution output of one or more computing tasks associated with the data identified within the second job execution request, and (e) transmitting to the first job manager machine, the output data received from the second job manager machine.

In a further embodiment of the method, the second job manager machine is configured to (i) select from among a second set of computing machines assigned to the second job manager machine, a second target computing machine, (ii) transmit to the selected second target computing machine, a second data message comprising data that has been received within the second job execution request, (iii) receive from the second target computing machine, output data comprising an execution output of one or more computing tasks associated with the identified job, and (iv) transmit the received output data to the first gateway device—wherein (v) the selected second target computing device is one of a second non-gateway machine and a second gateway machine, (vi) the second non-gateway machine is a processor implementing computing machine configured to respond to receiving the second data message from the second job manager machine by (a) generating the output data by executing the one or more computing tasks associated with the identified job, and (b) transmitting the output data to the second job manager machine, and (vii) the second gateway machine is a processor implementing computing machine configured to respond to receiving the data message from the second job manager machine by (c) transmitting a third job execution request to a third job manager machine that is different from the second job manager machine, wherein the third job execution request includes data identifying the identified job, (d) receiving from the third job manager machine, output data comprising an execution output of one or more computing tasks associated with the data identified within the third job execution request, and (e) transmitting to the second job manager machine, the output data received from the third job manager machine.

The invention also provides a system for implementing job execution within a network based remote computing environment, the system comprising a processor implemented first job manager machine configured to (i) receive a first job execution request transmitted by a job execution requesting device, wherein the received job execution request has been transmitted to the first job manager machine for execution within a remote computing environment, and identifies a job for execution within a remote computing environment, (ii) select from among a first set of computing machines assigned to the first job manager machine, a first target computing machine, (iii) transmit to the selected first target computing machine, a first data message comprising data that has been received within the first job execution request, (iv) receive from the first target computing machine, output data comprising an execution output of one or more computing tasks associated with the identified job, and (v) transmit the received output data to the job execution requesting device—wherein (vi) the selected first target computing device is one of a first non-gateway machine and a first gateway machine, (vii) the first non-gateway machine is a processor implementing computing machine configured to respond to receiving the first data message from the first job manager machine by (a) generating the output data by executing the one or more computing tasks associated with the identified job, and (b) transmitting the output data to the first job manager machine, and (viii) the first gateway machine is a processor implementing computing machine configured to respond to receiving the first data message from the first job manager machine by (c) transmitting a second job execution request to a second job manager machine that is different from the first job manager machine, wherein the second job execution request includes data identifying the identified job, (d) receiving from the second job manager machine, output data comprising an execution output of one or more computing tasks associated with the data identified within the second job execution request, and (e) transmitting to the first job manager machine, the output data received from the second job manager machine.

In a specific system embodiment, the second job manager machine is configured to (i) select from among a second set of computing machines assigned to the second job manager machine, a second target computing machine, (ii) transmit to the selected second target computing machine, a second data message comprising data that has been received within the second job execution request, (iii) receive from the second target computing machine, output data comprising an execution output of one or more computing tasks associated with the identified job, and (iv) transmit the received output data to the first gateway device—wherein (v) the selected second target computing device is one of a second non-gateway machine and a second gateway machine, (vi) the second non-gateway machine is a processor implementing computing machine configured to respond to receiving the second data message from the second job manager machine by (a) generating the output data by executing the one or more computing tasks associated with the identified job, and (b) transmitting the output data to the second job manager machine, and (vii) the second gateway machine is a processor implementing computing machine configured to respond to receiving the data message from the second job manager machine by (c) transmitting a third job execution request to a third job manager machine that is different from the second job manager machine, wherein the third job execution request includes data identifying the identified job, (d) receiving from the third job manager machine, output data comprising an execution output of one or more computing tasks associated with the data identified within the third job execution request, and (e) transmitting to the second job manager machine, the output data received from the third job manager machine.

The invention also provides a computer program product for implementing job execution within a network based remote computing environment. The computer program product comprises a non-transitory computer usable medium having a computer readable program code embodied therein, the computer readable program code comprising instructions for implementing, the steps of (i) receiving at a first job manager machine, a first job execution request transmitted by a job execution requesting device, wherein the received job execution request has been transmitted to the first job manager machine for execution within a remote computing environment, and identifies a job for execution within a remote computing environment, (ii) selecting from among a first set of computing machines assigned to the first job manager machine, a first target computing machine, (iii)

transmitting to the selected first target computing machine, a first data message comprising data that has been received within the first job execution request, (iv) receiving from the first target computing machine, output data comprising an execution output of one or more computing tasks associated with the identified job, and (v) transmitting the received output data to the job execution requesting device—wherein (vi) the selected first target computing device is one of a first non-gateway machine and a first gateway machine, (vii) the first non-gateway machine is a processor implementing computing machine configured to respond to receiving the first data message from the first job manager machine by (a) generating the output data by executing the one or more computing tasks associated with the identified job, and (b) transmitting the output data to the first job manager machine, and (viii) the first gateway machine is a processor implementing computing machine configured to respond to receiving the first data message from the first job manager machine by (c) transmitting a second job execution request to a second job manager machine that is different from the first job manager machine, wherein the second job execution request includes data identifying the identified job, (d) receiving from the second job manager machine, output data comprising an execution output of one or more computing tasks associated with the data identified within the second job execution request, and (e) transmitting to the first job manager machine, the output data received from the second job manager machine.

BRIEF DESCRIPTION OF THE ACCOMPANYING DRAWINGS

DETAILED DESCRIPTION

The present invention provides methods, systems and computer program products for job management and for allocating resources for cloud based or remote device based job processing.

In various embodiments, the invention provides scalable job manager architectures for remote computing environment based job execution.

Figure 1:
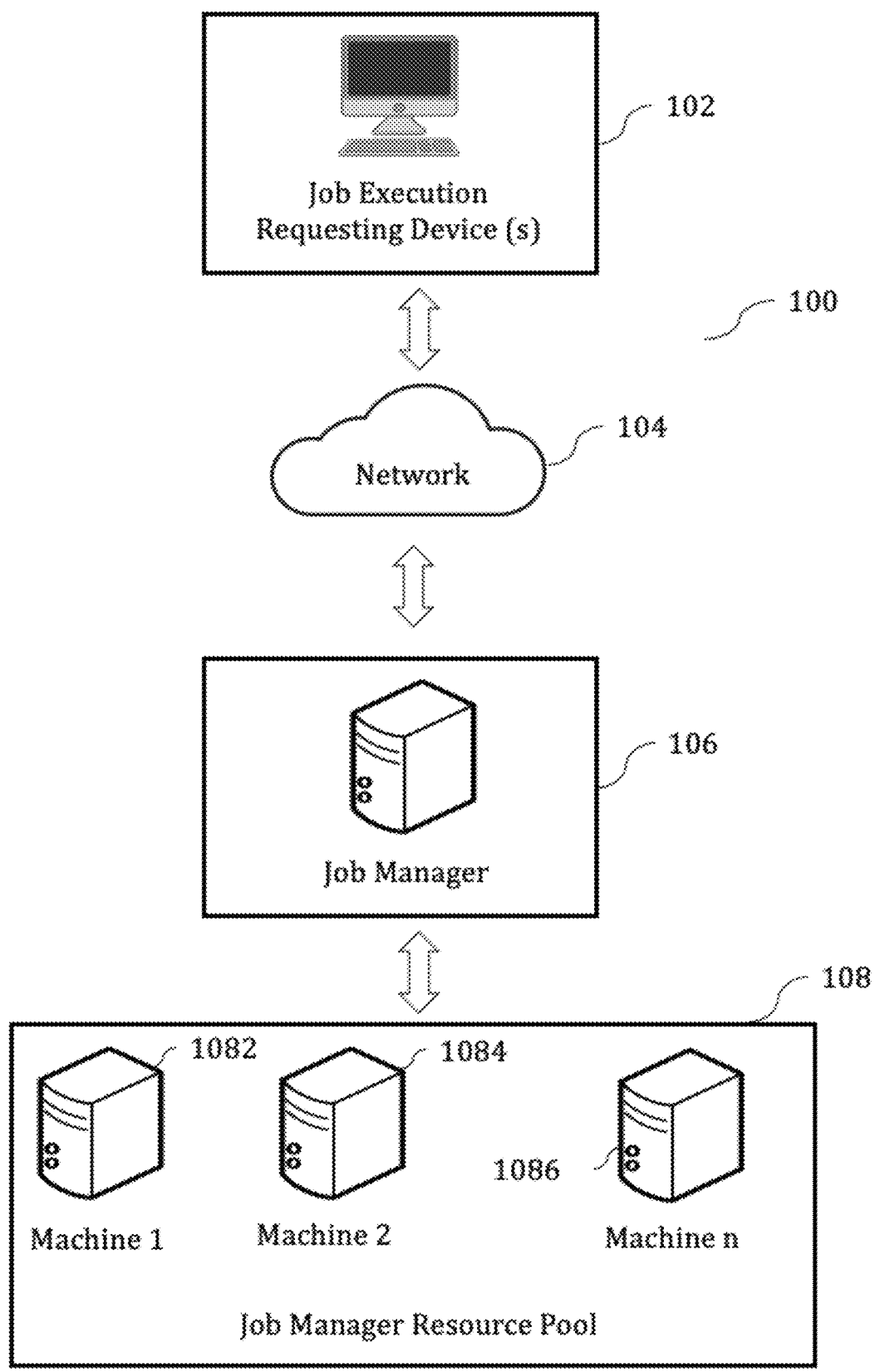
FIG. 1 illustrates a conventional system environment for remote computing environment based execution of jobs.
Figure 2:
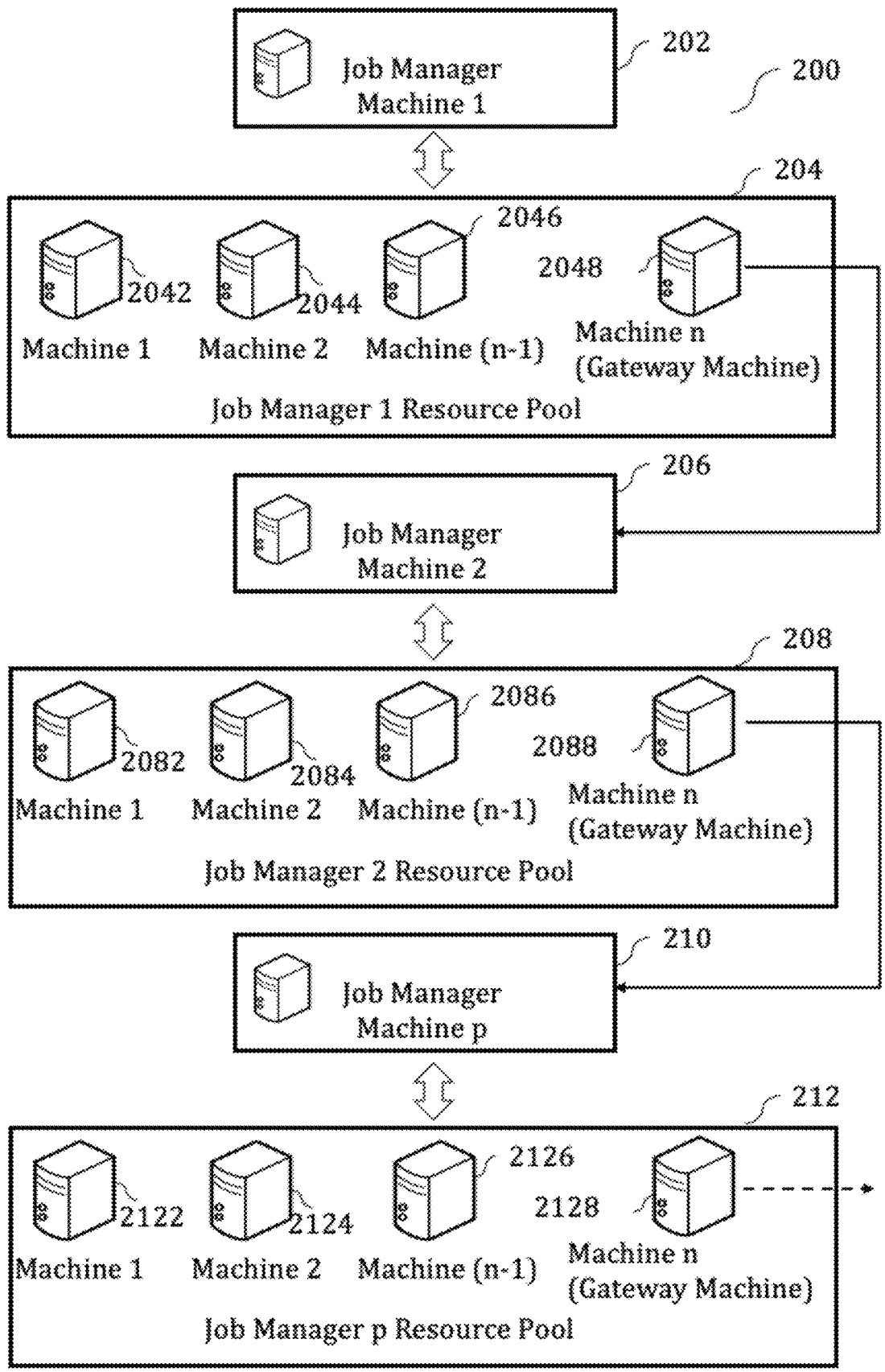
FIG. 2 illustrates a scalable job manager architecture for remote computing environment based job execution in accordance with the teachings of the present invention.

FIG. 2 illustrates a scalable job manager architecture for remote computing environment based job execution in accordance with the teachings of the present invention.

The system environment 200 of FIG. 2 illustrates a plurality of job manager machines 1 to p (202, 206, 210).

Each of the plurality of job manager machines 1 to p (202, 206, 210) has access to and implements the received jobs through a corresponding job manager resource pool assigned to or controlled by that particular job manager machine.

So in FIG. 2, job manager machine 1 (202) has access to and controls job manager 1 resource pool 204, job manager machine 2 (206) has access to and controls job manager 2 resource pool 208, and job manager machine p (210) has access to and controls job manager p resource pool 212. Each job manager resource pool 204, 208, 212 comprises a plurality of machines (or computing resources) 1 to n—and jobs received by any of job manager machines 1 to p, 202, 206, 210, may be distributed among the plurality of machines within the corresponding job manager resource pool, for execution.

Each of the plurality of machines 1 to n, (2042 to 2048; 2082 to 2088; 2122 to 2128) within a job manager resource pool (204, 208, 212) has access to and effects performance of jobs received by the corresponding job manager machine 202, 206, 210 to which the job manager resource pool 204, 208, 212 has been assigned (or is controlled by).

The job manager machines 1 to p (202, 206, 610), can be distributed at different locations and/or on different networks. When any of job manager machines 1 to p (202, 206, 210), receives a job request, it selects a free machine(s) within its corresponding job manager resource pool—ensuring that the selected machine meets the job requirements (number of cores or number and type of CPU, memory etc.) and sends the job (or one or more computing tasks associated with the job) to the selected machine. If no machines are free, the job manager machine may queue the job and try to find a suitable machine within its corresponding job manager resource pool, that is free. If a machine to which a job is allocated for execution crashes while running a job, the responsible job manager machine will allocate and re-run the job which was running while the machine crashed, on a different machine. Thus the job manager machine is configured to receive jobs for execution, and is responsible for running the job if an appropriate machine resource is available within its corresponding job manager resource pool.

Once an allocated job or computing task is run by a machine, the responsible job manager machine collects the output and sends it back to the requesting client machine (either directly or indirectly).

Each job manager resource pool 204, 208, 212 respectively corresponding to job manager machines 1 to p, 202, 206, 210, has a set of 'n' machines for running jobs allocated to the corresponding job manager machine. It would be understood that 'n' represents any number (and in some embodiments, 'n' may be any number greater than 1), and 'n' may represent a different number for each job manager resource pool 204, 208, 212. At least one (and possibly more than one) of the 'n' machines associated with each job manager machine is configured as, and/or identified as, and/or configured to identify itself as, a gateway machine. The remaining machines out of the 'n' machines are non-gateway machines. The configuration and functioning of gateway machines and non-gateway machines are described below.

Each gateway machine within each job manager resource pool is assigned or stores identification data and/or network address data of at least one target job manager machine (i.e. a 'target job manager machine') that is different from the job manager machine that allocates jobs to (or controls) machines within the job manager resource pool within which the gateway machine is located (i.e. the 'source job manager machine').

The system environment 200 or one or more machines or devices within the system environment 200 may be configured such that each job manager machine (when functioning as a source job manager machine) applies a set of rules or criteria to determine whether a job is to be allocated to a gateway machine or to any of the non-gateway machines within the corresponding job manager resource pool. These rules or criteria, as well as the rate at which jobs are assigned to a gateway machine by a source job manager machine can be dynamically changed. In an exemplary embodiment, the source job manager machine may be configured to allocate a job to a gateway machine within the job manager resource pool corresponding to the source job manager machine, when all other machines in the same job manager resource pool are fully occupied or when the load on the remaining machines within the same job manager resource pool is above a predefined threshold.

When a non-gateway machine within a job manager resource pool (i.e. a machine within the job manager resource pool that is not a gateway machine), receives a job from its source job manager machine, the non-gateway machine executes the job and passes the output of the executed job back to the source job manager machine. On the other hand, when a gateway machine receives a job from its source manager machine, the gateway machine forwards the job for execution to a target job manager machine whose identification data and/or network address data is stored within the gateway machine. In the event the gateway machine has identification data and/or network address data of a plurality of target job manager machines, it selects one out of the plurality of target job manager machines based on one or more predefined selection rules (e.g. rules to select a job manager machine that has the fewest queued jobs, sufficient number of available machines, the lightest load, the fastest execution speed, the lowest latency, or the lowest price associated with job execution). The target job manager machine receives the forwarded job (that has been forwarded by the gateway machine within the job manager resource pool corresponding to another job manager (i.e. the source job manager) and distributes the forwarded job to one of its own machines for execution.

In an embodiment, the target job manager is configured such that, when the target job manager machine receives a forwarded job or a forwarded job execution request from a gateway machine within a job manager resource pool of a source job manager machine, the target job manager responds to the forwarding gateway machine in the same manner as it would if the job or job execution request were received from a job execution requesting device.

When the forwarded job is completed, the target job manager collects the output and sends it back to the gateway machine that forwarded the job to the target job manager. The gateway machine then forwards the output of the completed job back to its source job manager in the same manner as if it had completed the outsourced job locally.

In an embodiment, the target job manager machine and its corresponding job manager resource pool may be configured identically as the source job manager machine and its corresponding job manager resource pool. In other words, the job manager resource pool corresponding to the target job manager machine may comprise at least one gateway machine, with the remaining machines being non-gateway machines—and a job allocated to a gateway machine within a job manager resource pool associated with a target job manager machine is in turn capable of forwarding a received job or job execution request to another job manager machine (i.e. yet another job manager machine that is different from the source job manager machine and the target job manager machine).

As a result, the process flow where a job or job execution request cascades from a source job manager to a target job manager is a transparent process, and can be used to serially cascade a job across multiple job manager machines and their corresponding job manager resource pools. The scalable architecture of the present invention thereby permits for a job to be transmitted in a cascading process flow across multiple job manager machines, until a receiving job manager machine is found that has sufficient computing resources to execute the job.

The number of job manager machines within the remote environment 200 can be dynamic. For example, a new job manager machine (and its corresponding job manager resource pool) can be readily added to the remote environment by recording address information of the new job manager machine in a memory allocated to one or more gateway machines within one or more existing job manager resource pools within resource environment 200. Future jobs or job execution requests forwarded to gateway machine(s) can thereafter be transmitted to the new job manager machine for execution.

The forwarding of jobs by a gateway machine (within a job manager resource pool associated with a source job manager machine) can be implemented in multiple different ways. In one exemplary embodiment, the gateway machine(s) is/are configured with instructions to forward any/all/specific jobs (or job execution requests) received from a source job manager machine to a target job manager machine. In another exemplary embodiment, the instructions for forwarding are provided as a script wrapper accompanying each job or job execution request forwarded by the source job manager machine (and in some embodiments, may even be included as a script wrapper accompanying each job when it is received by the source job manager machine). In an embodiment, the script wrapper includes instructions that if the job or job execution request is received by a machine that has been flagged or configured as a gateway machine, then the job should be forwarded to a target job manager machine associated with the gateway machine. In this embodiment, when a job or job execution request is allocated to a gateway machine by a source job manager machine, the gateway machine reads the wrapper script, recognizes that the conditions in the wrapper script have been fulfilled, and forwards the job or job execution request onward to the target job manager machine for execution.

Figure 3:
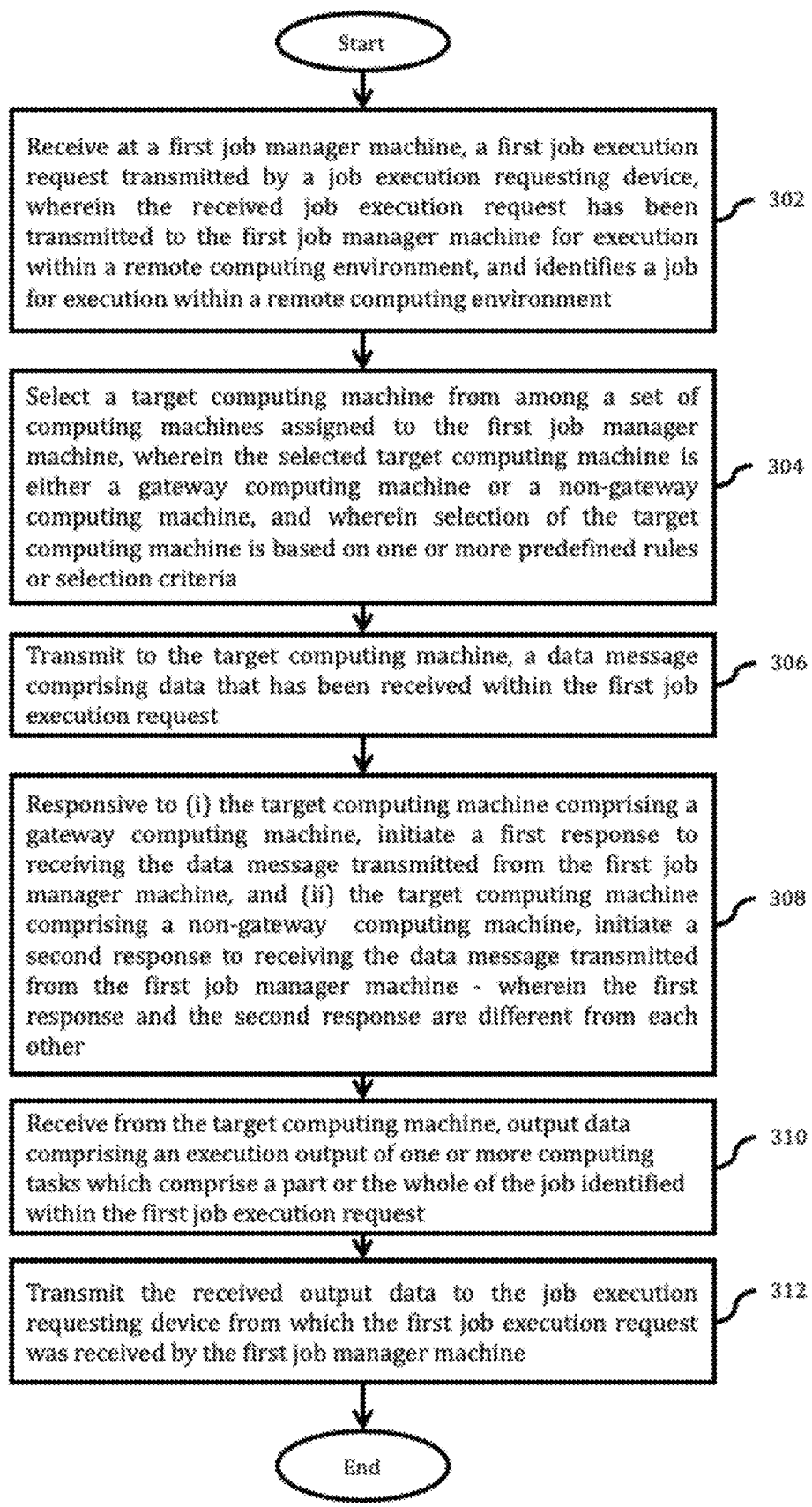
FIG. 3 is a flowchart illustrating a method for assigning a job execution request from a first job manager machine to a target computing machine, as implemented within the scalable job manager architecture of the present invention.

FIG. 3 is a flowchart illustrating a method for assigning a job execution request from a first job manager machine to a target computing machine, as implemented within the scalable job manager architecture of the present invention.

Step 302 comprises receiving at a first job manager machine, a first job execution request transmitted by a job execution requesting device, wherein the received job execution request has been transmitted to the first job manager machine for execution within a remote computing environment, and identifies a job for execution within a remote computing environment Step 304 comprises selecting a target computing machine from among a set of computing machines assigned to the first job manager machine, wherein the selected target computing machine is either a gateway machine or a non-gateway machine, and wherein selection of the target computing machine is based on one or more predefined rules or selection criteria.

The first job manager machine may apply a set of rules or criteria to determine whether the selected target machine is a gateway machine or a non-gateway machine within the corresponding job manager resource pool. These rules or criteria, as well as the rate at which jobs are assigned to a gateway machine by the first job manager machine can be dynamically changed. In an exemplary embodiment, the first job manager machine may be configured to allocate a job to a gateway machine within the job manager resource pool corresponding to the first job manager machine, when all non-gateway machines in the same job manager resource pool are fully occupied or when the load on the remaining non-gateway machines within the same job manager resource pool is above a predefined threshold.

Step 306 comprises transmitting from the first job manager machine to the selected target computing machine, a data message comprising data that has been received within the first job execution request. In an embodiment, the data within the data message may include data extracted from the first job execution request that identifies a job for execution within the remote computing environment. In another embodiment, the data message may comprise the first job execution request. In another embodiment, the data message may comprise a modified job execution request based on data extracted from the first job execution request.

At step 308, responsive to (i) the target computing machine comprising a gateway machine, said target computing machine initiates a first response to receiving the data message transmitted from the first job manager machine, and (ii) responsive to the target computing machine comprising a non-gateway computing machine, said target computing machine initiates a second response to receiving the data message transmitted from the first job manager machine. The first response and the second response are different from each other—and as a result, the manner in which a gateway machine responds to receiving the data message transmitted from the first job manager machine, is different from the manner in which a non-gateway machine responds to receiving the data message transmitted from the first job manager machine. The specific responses of gateway machines and non-gateway machines are described in more detail in connection with the methods of FIGS. 5 and 7.

Step 310 comprises receiving at the first job manager machine, from the target computing machine, output data comprising an execution output of one or more computing tasks which comprise a part or the whole of the job identified within the first job execution request.

Step 312 comprises transmitting the received output data, from the first job manager machine to the job execution requesting device from which the first job execution request was received by the first job manager machine.

Figure 4:
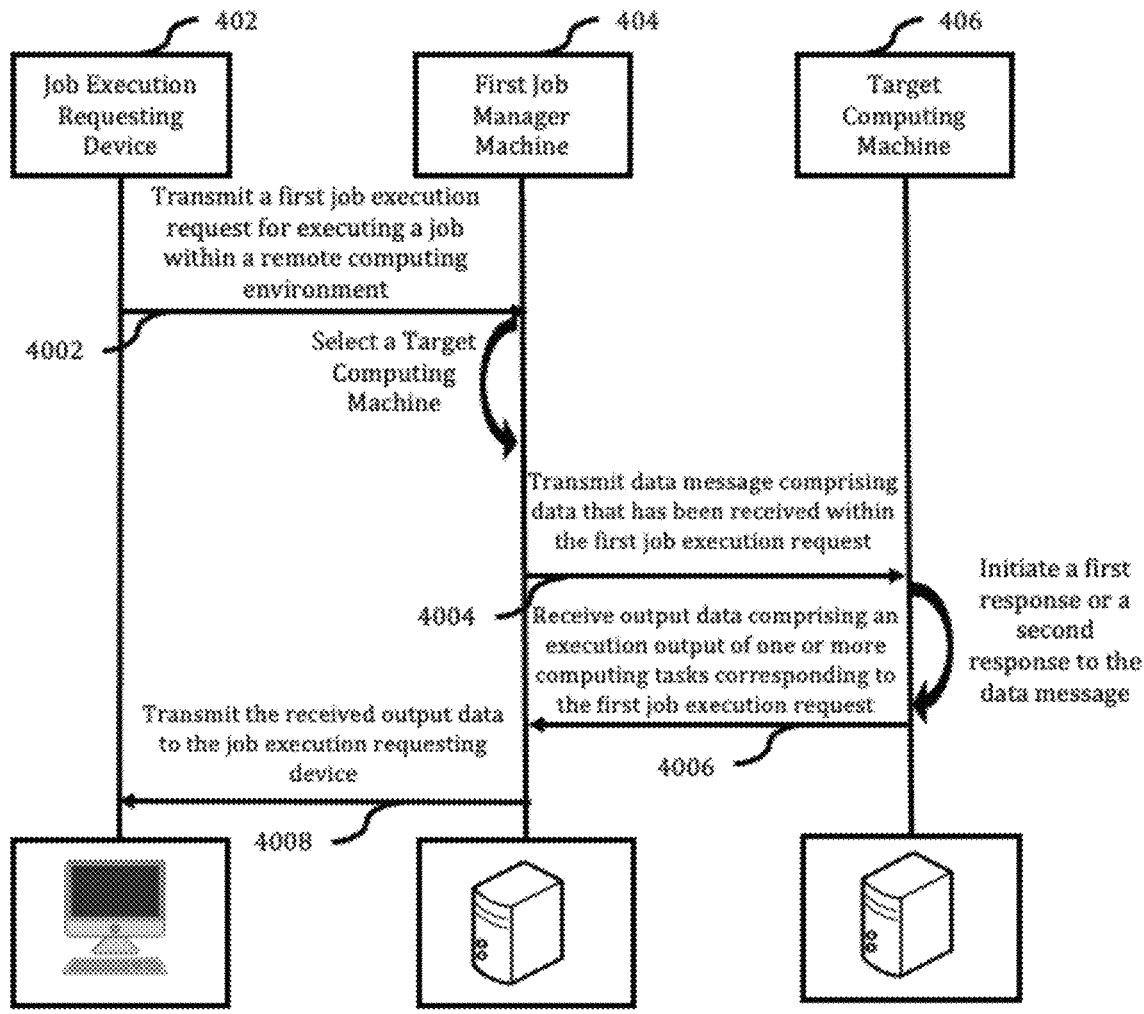
FIG. 4 is a communication flow diagram illustrating communication flow between system entities in implementing the method of FIG. 3.

FIG. 4 is a communication flow diagram illustrating communication flow between system entities in implementing the method of FIG. 3.

Step 4002 comprises receiving at a first job manager machine 404, a first job execution request transmitted by a job execution requesting device 402, wherein the received job execution request has been transmitted to the first job manager machine 404 for execution within a remote computing environment, and identifies a job for execution within a remote computing environment The first job manager machine selects a target computing machine 406 from among a set of computing machines assigned to the first job manager machine, wherein the selected target computing machine is either a gateway machine or a non-gateway machine, and wherein selection of the target computing machine is based on one or more predefined rules or selection criteria.

The first job manager machine may apply a set of rules or criteria to determine whether the selected target machine is a gateway machine or a non-gateway machine within the corresponding job manager resource pool. These rules or criteria, as well as the rate at which jobs are assigned to a gateway machine by the first job manager machine can be dynamically changed. In an exemplary embodiment, the first job manager machine may be configured to allocate a job to a gateway machine within the job manager resource pool corresponding to the first job manager machine, when all non-gateway machines in the same job manager resource pool are fully occupied or when the load on the remaining non-gateway machines within the same job manager resource pool is above a predefined threshold.

Step 4004 comprises transmitting from first job manager machine 404 to the selected target computing machine 406, a data message comprising data that has been received within the first job execution request. In an embodiment, the data within the data message may include data extracted from the first job execution request that identifies a job for execution within the remote computing environment. In another embodiment, the data message may comprise the first job execution request. In another embodiment, the data message may comprise a modified job execution request based on data extracted from the first job execution request.

Responsive to (i) the target computing machine comprising a gateway machine, said target computing machine initiates a first response to receiving the data message transmitted from the first job manager machine, and (ii) responsive to the target computing machine comprising a non-gateway computing machine, said target computing machine initiates a second response to receiving the data message transmitted from the first job manager machine. The first response and the second response are different from each other—and as a result, the manner in which a gateway machine responds to receiving the data message transmitted from the first job manager machine, is different from the manner in which a non-gateway machine responds to receiving the data message transmitted from the first job manager machine.

Step 4006 comprises receiving at first job manager machine 404, from the target computing machine 406, output data comprising an execution output of one or more computing tasks which comprise a part or the whole of the job identified within the first job execution request.

Step 4008 comprises transmit the received output data from first job manager machine 404 to job execution requesting device 402 from which the first job execution request was received by the first job manager machine.

Figure 5:
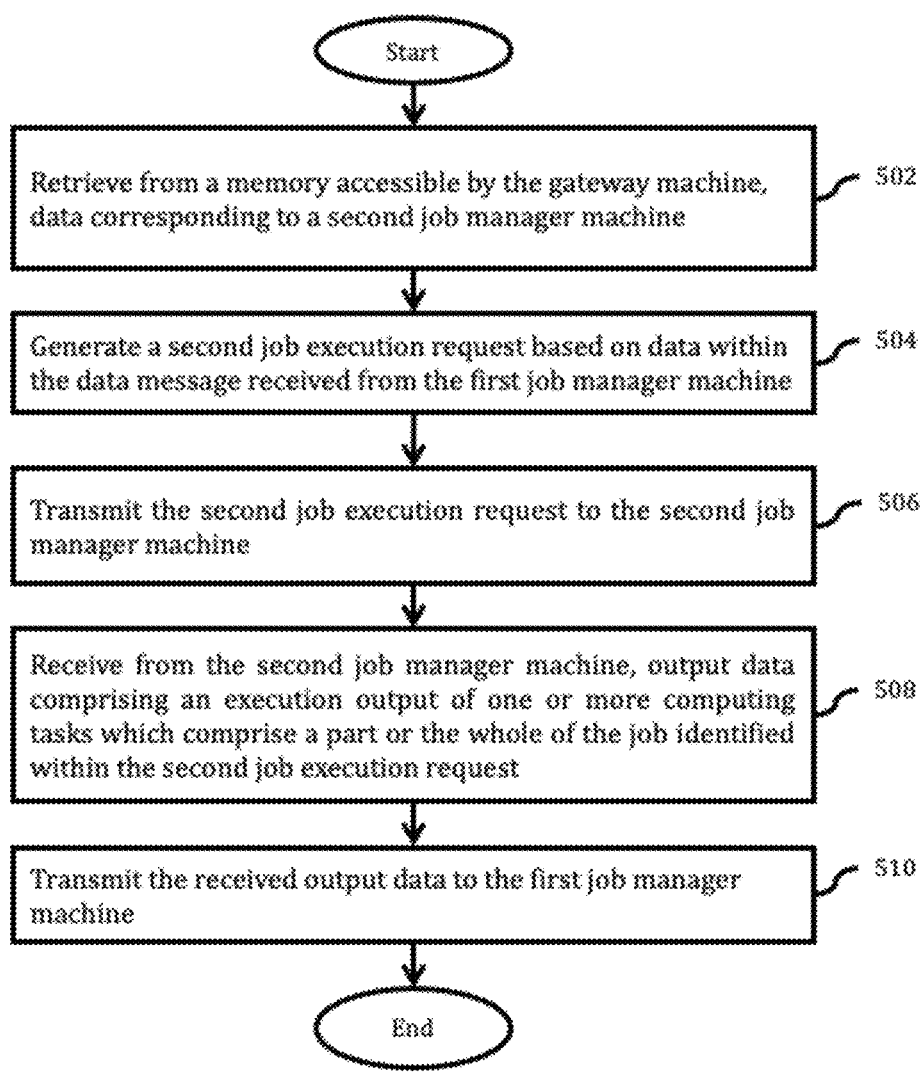
FIG. 5 is a flowchart illustrating a method for implementing job execution when the target computing machine is a gateway machine, as implemented within the scalable job manager architecture of the present invention.

FIG. 5 is a flowchart illustrating a method for implementing job execution when the target computing machine is a gateway machine, as implemented within the scalable job manager architecture of the present invention. In an embodiment, the method of FIG. 5 is implemented at a target computing machine that is a gateway machine. In a more particular embodiment, the method of FIG. 5 comprises the step 308 response of the target computing machine as described in connection with the method of FIG. 3.

Step 502 comprises retrieving from a memory accessible by the gateway machine, data corresponding to a second job manager machine. The retrieved data comprises at least identification data and/or network address data of a second job manager machine that is different from the first job manager machine which allocates jobs to (or controls) machines within a job manager resource pool within which the gateway machine is located Step 504 comprises generating a second job execution request based on data within the data message received from the first job manager machine (i.e. which has been received as a result of step 306 of the method of FIG. 3). In an embodiment, the second job execution request may include data extracted from the first job execution request that has been received at the first job manager machine (at step 302), which data identifies a job for execution within the remote computing environment. In another embodiment, the second job execution request may comprise the first job execution request. In another embodiment, the second job execution request may comprise a modified job execution request based on data extracted from the first job execution request.

Step 506 comprises transmitting the second job execution request to the second job manager machine—wherein said transmission relies on or is based on the data corresponding to the second job manager machine that has been retrieved at step 502 (e.g. the retrieved identification data and/or network address data).

Step 508 comprises receiving from the second job manager machine, output data comprising an execution output of one or more computing tasks which comprise a part or the whole of the job identified within the second job execution request. It would be understood that this output data has been generated based on execution of the computing task(s) under the control of the second job manager machine, or under the control of another job manager machine to which the second job manager machine has further cascaded execution of said computing task(s).

Step 510 comprises transmitting the received output data to the first job manager machine—which may thereafter transmit the received output data to a job execution requesting device from which the first job execution request was originally received.

Figure 6:
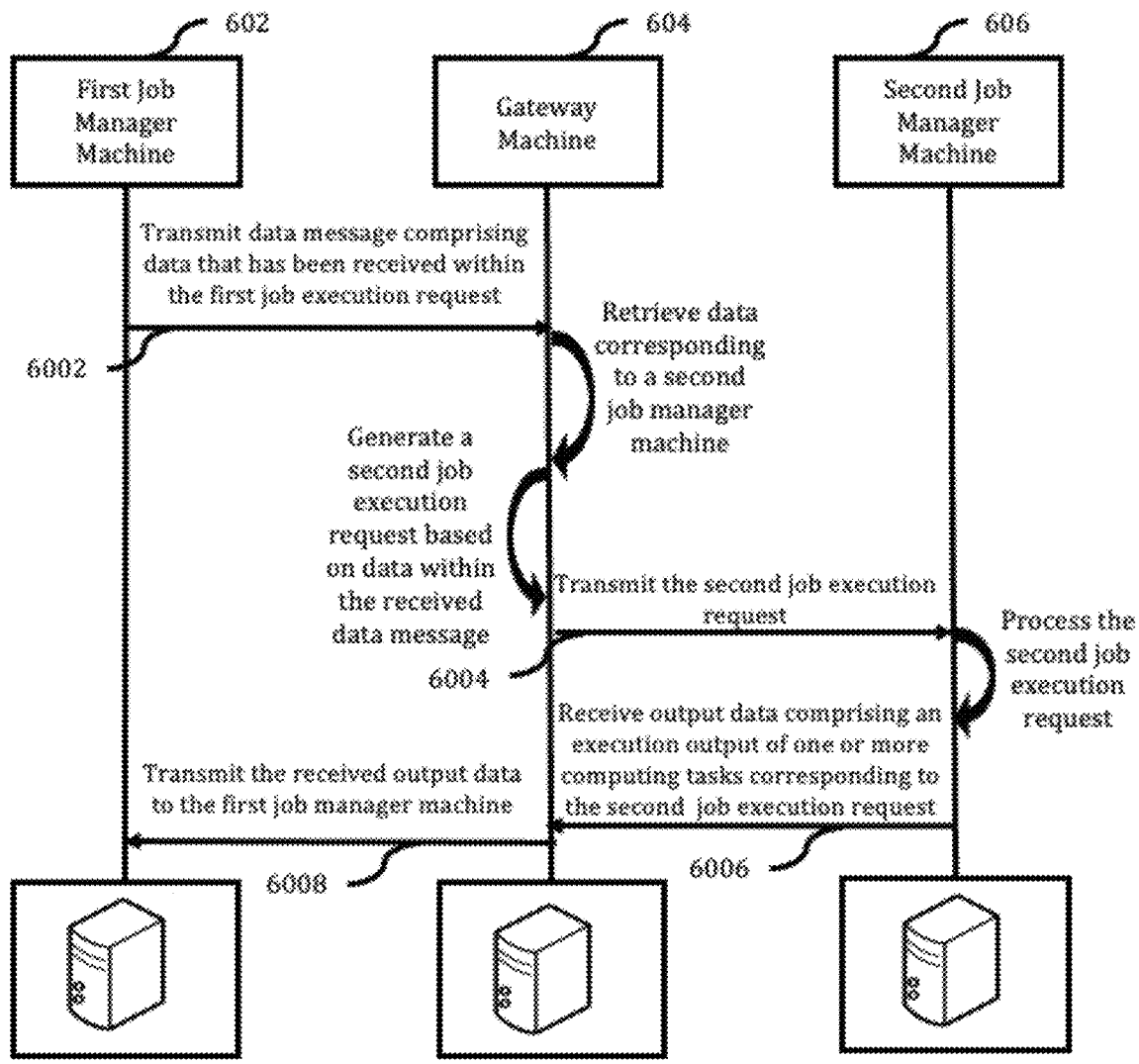
FIG. 6 is a communication flow diagram illustrating communication flow between system entities in implementing the method of FIG. 5.

FIG. 6 is a communication flow diagram illustrating communication flow between system entities in implementing the method of FIG. 5.

Step 6002 receiving at a gateway machine 604, a data message transmitted from first job manager machine 602. It would be understood that the transmission of the data message by the first job manager machine 602 corresponds to step 306 of the method of FIG. 3. The data message comprises data that has been received by first job manager machine 602 within a first job execution request received from a job execution requesting device. In an embodiment, the data within the data message may include data extracted from the first job execution request that identifies a job for execution within the remote computing environment. In another embodiment, the data message may comprise the first job execution request. In another embodiment, the data message may comprise a modified job execution request based on data extracted from the first job execution request.

Gateway machine 604 retrieving from a memory accessible by said gateway machine 604, data corresponding to a second job manager machine. The retrieved data comprises at least identification data and/or network address data of a second job manager machine that is different from the first job manager machine which allocates jobs to (or controls) machines within a job manager resource pool within which the gateway machine is located Thereafter, gateway machine 604 generates a second job execution request based on data within the data message received from first job manager machine 602. In an embodiment, the second job execution request may include data extracted from the first job execution request that has been received at the first job manager machine (at step 302), which data identifies a job for execution within the remote computing environment. In another embodiment, the second job execution request may comprise the first job execution request. In another embodiment, the second job execution request may comprise a modified job execution request based on data extracted from the first job execution request.

Step 6004 comprises transmitting the second job execution from gateway machine 604 to a second job manager machine 606—wherein said transmission relies on or is based on the data corresponding to the second job manager machine that has been retrieved from a memory accessible by gateway machine 604 (e.g. the retrieved identification data and/or network address data).

Second job manager machine 606 processes the second job execution request. It would be understood that this processing may involve either execution of one or more computing task(s) associated with the second job execution request, under the control of the second job manager machine, or under the control of another job manager machine to which the second job manager machine has further cascaded execution of said computing task(s).

Thereafter, step 6006 comprises receiving, at gateway machine 604, from second job manager machine 606, output data comprising an execution output of one or more computing tasks which comprise a part or the whole of the job identified within the second job execution request.

Step 6008 comprises transmitting the received output data from gateway machine 604 back to first job manager machine 602—which may thereafter transmit the received output data to a job execution requesting device from which the first job execution request was originally received.

Figure 7:
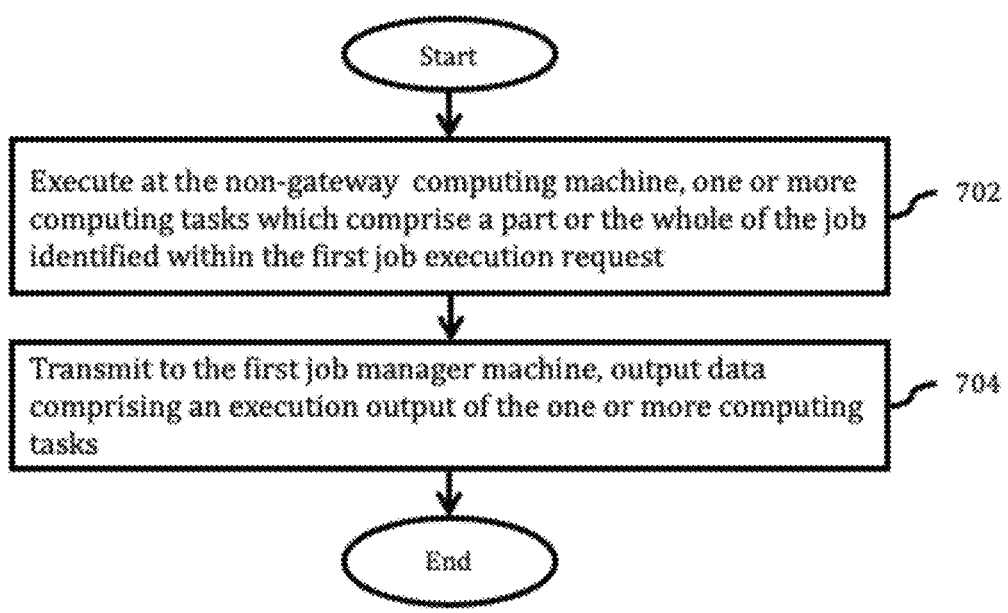
FIG. 7 is a flowchart illustrating a method for implementing job execution when the target computing machine is a non-gateway machine, as implemented within the scalable job manager architecture of the present invention.

FIG. 7 is a flowchart illustrating a method for implementing job execution when the target computing machine is a non-gateway machine, as implemented within the scalable job manager architecture of the present invention. In an embodiment, the method of FIG. 7 is implemented at a target computing machine that is a gateway machine. In a more particular embodiment, the method of FIG. 5 comprises the step 308 response of the target computing machine as described in connection with the method of FIG. 3.

Step 702 comprises executing at the non-gateway computing machine, one or more computing tasks which comprise a part or the whole of the job identified within the first job execution request.

Step 704 comprises transmitting to the first job manager machine, output data comprising an execution output of the one or more computing tasks. The first job manager machine may thereafter transmit the received output data to a job execution requesting device from which the first job execution request was originally received.

Figure 8:
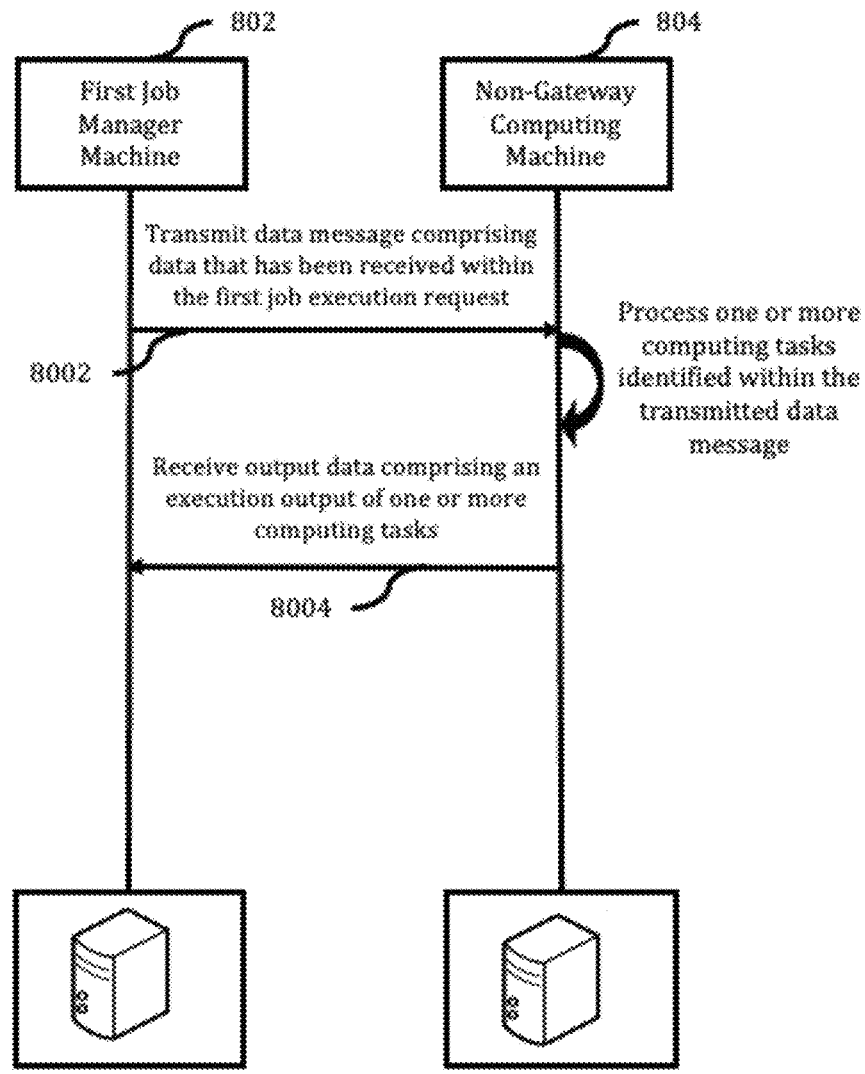
FIG. 8 is a communication flow diagram illustrating communication flow between system entities in implementing the method of FIG. 5.

FIG. 8 is a communication flow diagram illustrating communication flow between system entities in implementing the method of FIG. 5.

Step 8002 comprises receiving at a non-gateway machine 804, a data message transmitted from first job manager machine 802. It would be understood that the transmission of the data message by the first job manager machine 802 corresponds to step 306 of the method of FIG. 3. The data message comprises data that has been received by first job manager machine 802 within a first job execution request received from a job execution requesting device. In an embodiment, the data within the data message may include data extracted from the first job execution request that identifies a job for execution within the remote computing environment. In another embodiment, the data message may comprise the first job execution request. In another embodiment, the data message may comprise a modified job execution request based on data extracted from the first job execution request.

Non-gateway machine 804 processes or executes one or more computing tasks which comprise a part or the whole of the job identified within the transmitted data message.

Step 8004 comprises transmitting from non-gateway machine 804 to first job manager machine 802, output data comprising an execution output of the one or more computing tasks. First job manager machine 802 may thereafter transmit the received output data to a job execution requesting device from which the first job execution request was originally received.

The invention provides a method for implementing job execution within a network based remote computing environment. The method comprises (i) receiving at a first job manager machine, a first job execution request transmitted by a job execution requesting device, wherein the received job execution request has been transmitted to the first job manager machine for execution within a remote computing environment, and identifies a job for execution within a remote computing environment, (ii) selecting from among a first set of computing machines assigned to the first job manager machine, a first target computing machine, (iii) transmitting to the selected first target computing machine, a first data message comprising data that has been received within the first job execution request, (iv) receiving from the first target computing machine, output data comprising an execution output of one or more computing tasks associated with the identified job, and (v) transmitting the received output data to the job execution requesting device—wherein (vi) the selected first target computing device is one of a first non-gateway machine and a first gateway machine, (vii) the first non-gateway machine is a processor implementing computing machine configured to respond to receiving the first data message from the first job manager machine by (a) generating the output data by executing the one or more computing tasks associated with the identified job, and (b) transmitting the output data to the first job manager machine, and (viii) the first gateway machine is a processor implementing computing machine configured to respond to receiving the first data message from the first job manager machine by (c) transmitting a second job execution request to a second job manager machine that is different from the first job manager machine, wherein the second job execution request includes data identifying the identified job, (d) receiving from the second job manager machine, output data comprising an execution output of one or more computing tasks associated with the data identified within the second job execution request, and (e) transmitting to the first job manager machine, the output data received from the second job manager machine.

In method embodiment, selection of the target computing machine is based on one or more predefined selection rules.

In another embodiment of the method, transmission of the second job execution request to the second job manager machine is based on retrieval of network address data identifying a network address of the second job manager machine, from a memory that is coupled with or accessible by the first gateway machine.

In a further embodiment of the method, the second job manager machine is configured to (i) select from among a second set of computing machines assigned to the second job manager machine, a second target computing machine, (ii) transmit to the selected second target computing machine, a second data message comprising data that has been received within the second job execution request, (iii) receive from the second target computing machine, output data comprising an execution output of one or more computing tasks associated with the identified job, and (iv) transmit the received output data to the first gateway device—wherein (v) the selected second target computing device is one of a second non-gateway machine and a second gateway machine, (vi) the second non-gateway machine is a processor implementing computing machine configured to respond to receiving the second data message from the second job manager machine by (a) generating the output data by executing the one or more computing tasks associated with the identified job, and (b) transmitting the output data to the second job manager machine, and (vii) the second gateway machine is a processor implementing computing machine configured to respond to receiving the data message from the second job manager machine by (c) transmitting a third job execution request to a third job manager machine that is different from the second job manager machine, wherein the third job execution request includes data identifying the identified job, (d) receiving from the third job manager machine, output data comprising an execution output of one or more computing tasks associated with the data identified within the third job execution request, and (e) transmitting to the second job manager machine, the output data received from the third job manager machine.

In a specific embodiment of the method, the first gateway machine is configured to selectively operate as one of a gateway device or as a non-gateway device, wherein the first gateway machine selectively operates as the gateway device in response to receiving script wrapper data associated the first data message, wherein said script wrapper data includes an instruction for the first gateway device to operate as the gateway device.

In another embodiment of the method, the first gateway machine is configured to consistently operate as a gateway device in respect of all jobs or computing tasks associated with data messages transmitted to the first gateway machine by the first job manager.

The invention also provides a system for implementing job execution within a network based remote computing environment, the system comprising a processor implemented first job manager machine configured to (i) receive a first job execution request transmitted by a job execution requesting device, wherein the received job execution request has been transmitted to the first job manager machine for execution within a remote computing environment, and identifies a job for execution within a remote computing environment, (ii) select from among a first set of computing machines assigned to the first job manager machine, a first target computing machine, (iii) transmit to the selected first target computing machine, a first data message comprising data that has been received within the first job execution request, (iv) receive from the first target computing machine, output data comprising an execution output of one or more computing tasks associated with the identified job, and (v) transmit the received output data to the job execution requesting device—wherein (vi) the selected first target computing device is one of a first non-gateway machine and a first gateway machine, (vii) the first non-gateway machine is a processor implementing computing machine configured to respond to receiving the first data message from the first job manager machine by (a) generating the output data by executing the one or more computing tasks associated with the identified job, and (b) transmitting the output data to the first job manager machine, and (viii) the first gateway machine is a processor implementing computing machine configured to respond to receiving the first data message from the first job manager machine by (c) transmitting a second job execution request to a second job manager machine that is different from the first job manager machine, wherein the second job execution request includes data identifying the identified job, (d) receiving from the second job manager machine, output data comprising an execution output of one or more computing tasks associated with the data identified within the second job execution request, and (e) transmitting to the first job manager machine, the output data received from the second job manager machine.

In a system embodiment, selection of the target computing machine is based on one or more predefined selection rules.

In another embodiment of the system, transmission of the second job execution request to the second job manager machine is based on retrieval of network address data identifying a network address of the second job manager machine, from a memory that is coupled with or accessible by the first gateway machine.

In a specific system embodiment, the second job manager machine is configured to (i) select from among a second set of computing machines assigned to the second job manager machine, a second target computing machine, (ii) transmit to the selected second target computing machine, a second data message comprising data that has been received within the second job execution request, (iii) receive from the second target computing machine, output data comprising an execution output of one or more computing tasks associated with the identified job, and (iv) transmit the received output data to the first gateway device—wherein (v) the selected second target computing device is one of a second non-gateway machine and a second gateway machine, (vi) the second non-gateway machine is a processor implementing computing machine configured to respond to receiving the second data message from the second job manager machine by (a) generating the output data by executing the one or more computing tasks associated with the identified job, and (b) transmitting the output data to the second job manager machine, and (vii) the second gateway machine is a processor implementing computing machine configured to respond to receiving the data message from the second job manager machine by (c) transmitting a third job execution request to a third job manager machine that is different from the second job manager machine, wherein the third job execution request includes data identifying the identified job, (d) receiving from the third job manager machine, output data comprising an execution output of one or more computing tasks associated with the data identified within the third job execution request, and (e) transmitting to the second job manager machine, the output data received from the third job manager machine.

In a further system embodiment, the first gateway machine is configured to selectively operate as one of a gateway device or as a non-gateway device, wherein the first gateway machine selectively operates as the gateway device in response to receiving script wrapper data associated the first data message, wherein said script wrapper data includes an instruction for the first gateway device to operate as the gateway device.

In another system embodiment, the first gateway machine is configured to consistently operate as a gateway device in respect of all jobs or computing tasks associated with data messages transmitted to the first gateway machine by the first job manager.

The invention also provides a computer program product for implementing job execution within a network based remote computing environment. The computer program product comprises a non-transitory computer usable medium having a computer readable program code embodied therein, the computer readable program code comprising instructions for implementing, the steps of (i) receiving at a first job manager machine, a first job execution request transmitted by a job execution requesting device, wherein the received job execution request has been transmitted to the first job manager machine for execution within a remote computing environment, and identifies a job for execution within a remote computing environment, (ii) selecting from among a first set of computing machines assigned to the first job manager machine, a first target computing machine, (iii) transmitting to the selected first target computing machine, a first data message comprising data that has been received within the first job execution request, (iv) receiving from the first target computing machine, output data comprising an execution output of one or more computing tasks associated with the identified job, and (v) transmitting the received output data to the job execution requesting device—wherein (vi) the selected first target computing device is one of a first non-gateway machine and a first gateway machine, (vii) the first non-gateway machine is a processor implementing computing machine configured to respond to receiving the first data message from the first job manager machine by (a) generating the output data by executing the one or more computing tasks associated with the identified job, and (b) transmitting the output data to the first job manager machine, and (viii) the first gateway machine is a processor implementing computing machine configured to respond to receiving the first data message from the first job manager machine by (c) transmitting a second job execution request to a second job manager machine that is different from the first job manager machine, wherein the second job execution request includes data identifying the identified job, (d) receiving from the second job manager machine, output data comprising an execution output of one or more computing tasks associated with the data identified within the second job execution request, and (e) transmitting to the first job manager machine, the output data received from the second job manager machine.

Figure 9:
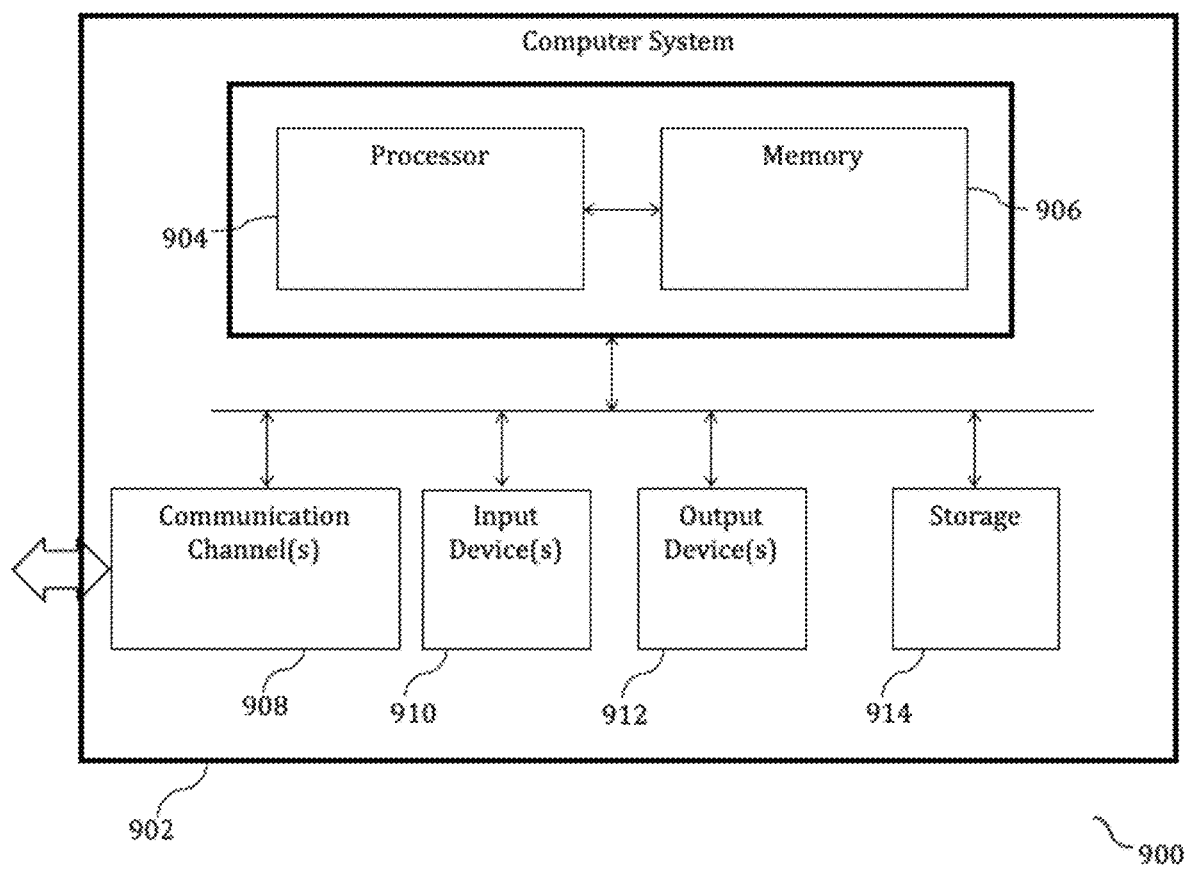
FIG. 9 illustrates an exemplary computer system of a type that may be used to implement the teachings of the present invention.

FIG. 9 illustrates an exemplary computer system according to which various embodiments of the present invention may be implemented.

System 900 includes computer system 902 which in turn comprises one or more processors 904 and at least one memory 906. Processor 904 is configured to execute program instructions—and may be a real processor or a virtual processor. It will be understood that computer system 902 does not suggest any limitation as to scope of use or functionality of described embodiments. The computer system 902 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 902 in accordance with the present invention may include one or more servers, desktops, laptops, tablets, smart phones, mobile phones, mobile communication devices, phablets and personal digital assistants. In an embodiment of the present invention, the memory 906 may store software for implementing various embodiments of the present invention. The computer system 902 may have additional components. For example, the computer system 902 may include one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902 using a processor 904, and manages different functionalities of the components of the computer system 902.

The communication channel(s) 908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 910 may include, but is not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 902.

The storage 914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 902. In various embodiments of the present invention, the storage 914 may contain program instructions for implementing any of the described embodiments.

In an embodiment of the present invention, the computer system 902 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, comprising a set of program instructions that is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers multiple and significant advantages, including (i) eliminating bottlenecks arising out of a single job manager architecture, (ii) enabling job managers to handle peak loads that exceed the computing loads that the job manager has been configured to handle, and (iii) providing a readily scalable system that enables execution of jobs within a remote environment, in a manner that eliminates or reduces processing overheads and latency.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for implementing job execution within a network based remote computing environment, the method comprising:
   receiving at a first job manager machine, a first job execution request transmitted by a job execution requesting device, wherein the received job execution request has been transmitted to the first job manager machine for execution within a remote computing environment, and identifies a job for execution within a remote computing environment;
   selecting from among a first set of computing machines assigned to the first job manager machine, a first target computing machine;
   transmitting to the selected first target computing machine, a first data message comprising data that has been received within the first job execution request;
   receiving from the first target computing machine, output data comprising an execution output of one or more computing tasks associated with the identified job; and
   transmitting the received output data to the job execution requesting device;
   wherein:
   the selected first target computing device is one of a first non-gateway machine and a first gateway machine;
   the first non-gateway machine is a processor implementing computing machine configured to respond to receiving the first data message from the first job manager machine by:
      generating the output data by executing the one or more computing tasks associated with the identified job; and
      transmitting the output data to the first job manager machine;

and the first gateway machine is a processor implementing computing machine configured to respond to receiving the first data message from the first job manager machine by:

transmitting a second job execution request to a second job manager machine that is different from the first job manager machine, wherein the second job execution request includes data identifying the identified job;

receiving from the second job manager machine, output data comprising an execution output of one or more computing tasks associated with the data identified within the second job execution request; and transmitting to the first job manager machine, the output data received from the second job manager machine.

2. The method as claimed in claim 1, wherein selection of the target computing machine is based on one or more predefined selection rules.

3. The method as claimed in claim 1, wherein transmission of the second job execution request to the second job manager machine is based on retrieval of network address data identifying a network address of the second job manager machine, from a memory that is coupled with or accessible by the first gateway machine.

4. The method as claimed in claim 1, wherein the second job manager machine is configured to:

select from among a second set of computing machines assigned to the second job manager machine, a second target computing machine;

transmit to the selected second target computing machine, a second data message comprising data that has been received within the second job execution request;

receive from the second target computing machine, output data comprising an execution output of one or more computing tasks associated with the identified job; and transmit the received output data to the first gateway device;

wherein:

the selected second target computing device is one of a second non-gateway machine and a second gateway machine;

the second non-gateway machine is a processor implementing computing machine configured to respond to receiving the second data message from the second job manager machine by:

generating the output data by executing the one or more computing tasks associated with the identified job; and transmitting the output data to the second job manager machine;

and the second gateway machine is a processor implementing computing machine configured to respond to receiving the data message from the second job manager machine by:

transmitting a third job execution request to a third job manager machine that is different from the second job manager machine, wherein the third job execution request includes data identifying the identified job;

receiving from the third job manager machine, output data comprising an execution output of one or more computing tasks associated with the data identified within the third job execution request; and transmitting to the second job manager machine, the output data received from the third job manager machine.

5. The method as claimed in claim 1, wherein the first gateway machine is configured to selectively operate as one of a gateway device or as a non-gateway device, wherein the first gateway machine selectively operates as the gateway device in response to receiving script wrapper data associated the first data message, wherein said script wrapper data includes an instruction for the first gateway device to operate as the gateway device.

6. The method as claimed in claim 1, wherein the first gateway machine is configured to consistently operate as a gateway device in respect of all jobs or computing tasks associated with data messages transmitted to the first gateway machine by the first job manager.

7. The system as claimed in claim 1, wherein the first gateway machine is configured to consistently operate as a gateway device in respect of all jobs or computing tasks associated with data messages transmitted to the first gateway machine by the first job manager.

8. A system for implementing job execution within a network based remote computing environment, the system comprising:

a processor implemented first job manager machine configured to:

receive a first job execution request transmitted by a job execution requesting device, wherein the received job execution request has been transmitted to the first job manager machine for execution within a remote computing environment, and identifies a job for execution within a remote computing environment;

select from among a first set of computing machines assigned to the first job manager machine, a first target computing machine;

transmit to the selected first target computing machine, a first data message comprising data that has been received within the first job execution request;

receive from the first target computing machine, output data comprising an execution output of one or more computing tasks associated with the identified job; and transmit the received output data to the job execution requesting device;

wherein:

the selected first target computing device is one of a first non-gateway machine and a first gateway machine;

the first non-gateway machine is a processor implementing computing machine configured to respond to receiving the first data message from the first job manager machine by:

generating the output data by executing the one or more computing tasks associated with the identified job; and transmitting the output data to the first job manager machine;

and the first gateway machine is a processor implementing computing machine configured to respond to receiving the first data message from the first job manager machine by:

transmitting a second job execution request to a second job manager machine that is different from the first job manager machine, wherein the second job execution request includes data identifying the identified job;

receiving from the second job manager machine, output data comprising an execution output of one or more computing tasks associated with the data identified within the second job execution request; and transmitting to the first job manager machine, the output data received from the second job manager machine.

9. The system as claimed in claim 8, wherein selection of the target computing machine is based on one or more predefined selection rules.

10. The system as claimed in claim 8, wherein transmission of the second job execution request to the second job manager machine is based on retrieval of network address data identifying a network address of the second job manager machine, from a memory that is coupled with or accessible by the first gateway machine.

11. The system as claimed in claim 8, wherein the second job manager machine is configured to:

select from among a second set of computing machines assigned to the second job manager machine, a second target computing machine;

transmit to the selected second target computing machine, a second data message comprising data that has been received within the second job execution request;

receive from the second target computing machine, output data comprising an execution output of one or more computing tasks associated with the identified job; and transmit the received output data to the first gateway device;

wherein:

the selected second target computing device is one of a second non-gateway machine and a second gateway machine;

the second non-gateway machine is a processor implementing computing machine configured to respond to receiving the second data message from the second job manager machine by:

generating the output data by executing the one or more computing tasks associated with the identified job; and transmitting the output data to the second job manager machine;

and the second gateway machine is a processor implementing computing machine configured to respond to receiving the data message from the second job manager machine by:

transmitting a third job execution request to a third job manager machine that is different from the second job manager machine, wherein the third job execution request includes data identifying the identified job;

receiving from the third job manager machine, output data comprising an execution output of one or more computing tasks associated with the data identified within the third job execution request; and transmitting to the second job manager machine, the output data received from the third job manager machine.

12. The system as claimed in claim 8, wherein the first gateway machine is configured to selectively operate as one of a gateway device or as a non-gateway device, wherein the first gateway machine selectively operates as the gateway device in response to receiving script wrapper data associated the first data message, wherein said script wrapper data includes an instruction for the first gateway device to operate as the gateway device.

13. A computer program product for implementing job execution within a network based remote computing environment, comprising a non-transitory computer usable medium having a computer readable program code embodied therein, the computer readable program code comprising instructions for implementing, the steps of:

receiving at a first job manager machine, a first job execution request transmitted by a job execution requesting device, wherein the received job execution request has been transmitted to the first job manager machine for execution within a remote computing environment, and identifies a job for execution within a remote computing environment;

selecting from among a first set of computing machines assigned to the first job manager machine, a first target computing machine;

transmitting to the selected first target computing machine, a first data message comprising data that has been received within the first job execution request;

receiving from the first target computing machine, output data comprising an execution output of one or more computing tasks associated with the identified job; and transmitting the received output data to the job execution requesting device;

wherein:

the selected first target computing device is one of a first non-gateway machine and a first gateway machine;

the first non-gateway machine is a processor implementing computing machine configured to respond to receiving the first data message from the first job manager machine by:

generating the output data by executing the one or more computing tasks associated with the identified job; and transmitting the output data to the first job manager machine;

and the first gateway machine is a processor implementing computing machine configured to respond to receiving the first data message from the first job manager machine by:

transmitting a second job execution request to a second job manager machine that is different from the first job manager machine, wherein the second job execution request includes data identifying the identified job;

receiving from the second job manager machine, output data comprising an execution output of one or more computing tasks associated with the data identified within the second job execution request; and transmitting to the first job manager machine, the output data received from the second job manager machine.

\* \* \* \* \*